United States Patent Office 3,344,140
Patented Sept. 26, 1967

3,344,140
DERIVATIVES OF 1,2,4-BENZOTHIADIAZINE-1,1-DIOXIDES
Bernard Loev, Broomall, Pa., assignor to Smith Kline & French Laboratories, Philadelphia, Pa., a corporation of Pennsylvania
No Drawing. Original application Feb. 27, 1963, Ser. No. 261,481. Divided and this application June 21, 1966, Ser. No. 559,123
8 Claims. (Cl. 260—243)

This application is a division of Serial No. 261,481 filed February 27, 1963 now abandoned.

This invention relates to novel 7-carbamoylsulfamoyl-2H - 1,2,4 - benzothiadiazine-1,1-dioxodies having pharmacodynamic activity, in particular having diuretic and hypotensive activity. In addition, this invention relates to novel carbamoylsulfamoylanline intermediates.

The new 7-carbamoylsulfamoyl-2H-1,2,4-benzothiadiazine-1,1-dioxides of this invention are represented by the following formulas.

*Formula I*

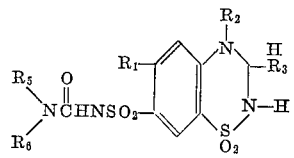

and

*Formula II*

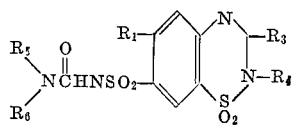

when:

$R_1$ is hydrogen, halogen, trifluoromethyl, lower alkyl, lower alkoxy or amino;
$R_2$ is hydrogen or lower alkyl:
$R_3$ is hydrogen, lower alkyl, halo lower alkyl, phenyl, phenylalkyl such as benzyl or phenethyl, cycloalkyl, cycloalkyl-alkyl such as cyclopentylmethyl or cyclohexylmethyl, cycloalkenylalkyl such as cyclopentenylmethyl or cyclohexenylmethyl, phenoxyalkyl such as phenoxymethyl or phenylthioalkyl such as phenylthiomethyl;
$R_4$ is hydrogen or

$R_5$ is lower alkyl, cycloalkyl such as cyclopentyl or cyclohexyl or phenylalkyl such as benzyl or phenethyl; and
$R_6$ is hydrogen or, when $R_5$ is lower alkyl, lower alkyl or, when taken together with $R_5$ and the nitrogen atom to which they are attached, N-pyrrolidinyl or N-piperidyl.

Advantageous compounds of this invention are represented by Formulas I and II when:
$R_1$ is halogen or trifluoromethyl;
$R_2$ is hydrogen;
$R_3$ is hydrogen, lower alkyl, halo lower alkyl or benzyl;
$R_4$ is hydrogen or

$R_5$ is lower alkyl, cyclopentyl or cyclohexyl; and
$R_6$ is hydrogen.

Novel carbamoylsulfamoylaniline compounds useful as intermediates in the preparation of benzothiadiazine derivatives of Formulas I and II are further objects of this invention and are represented by the following formula.

*Formula III*

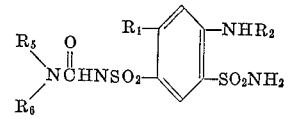

in which:

$R_1$ is hydrogen, halogen, trifluoromethyl, lower alkyl, lower alkoxy or amino;
$R_2$ is hydrogen or lower alkyl;
$R_5$ is lower alkyl, cycloalkyl such as cyclopentyl or cyclohexyl, or phenylalkyl such as benzyl or phenethyl; and
$R_6$ is hydrogen or, when $R_5$ is lower alkyl, lower alkyl or, when taken together with $R_5$ and the nitrogen atom to which they are attached, N-pyrrolidinyl or N-piperidyl.

The terms "lower alkyl" and "lower alkoxy" where used herein denote groups having 1 to 6 carbon atoms. The term "cycloalkyl" denotes groups having 3 to 6 carbon atoms.

Benzothiadiazine derivatives of this invention are prepared by the following procedures.

*Procedure A*

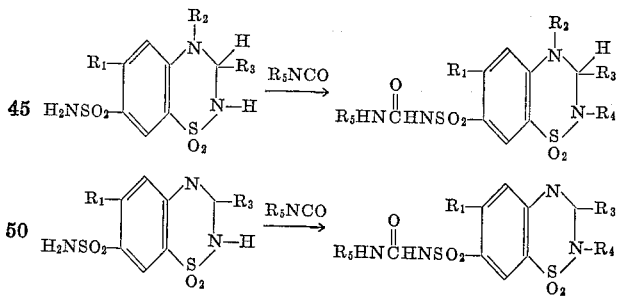

The terms $R_1$, $R_2$, $R_3$, $R_4$ and $R_5$ are as defined above.

According to Procedure A, a 7-sulfamoyl-2H-1,2,4-benzothiadiazide-1,1-dioxide is reacted with the appropriate isocyanate. The reaction is carried out in aqueous solution or in an inert solution such as acetone or a lower alkanol, for example ethanol, in the presence of a base such as alkali metal hydroxide or carbonate or a tertiary amine, for example triethylamine, at about 0–45 ° C. Working up by removing the solvent acidifying the solution and filtering gives a mixture of 7-carbamoylsulfamoyl and 2-carbamoyl-7-carbamoylsulfamoyl benzothiadiazines which are separated, for example, by chromatography.

Procedure B

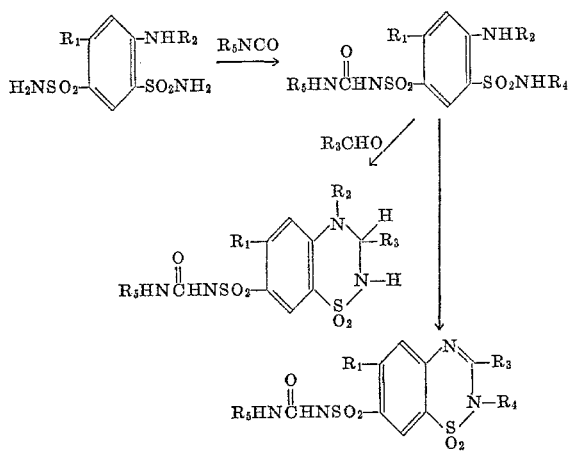

The terms $R_1$, $R_2$, $R_3$, $R_4$ and $R_5$ are as defined above.

According to Procedure B, a 2,4-disulfamoylaniline is reacted with an excess of the appropriate isocyanate to give, after separating the resulting isomers, for example, by chromatography, the 2 - sulfamoyl-4-carbamoylsulfamoylaniline and the 2,4-di-(carbamoylsulfamoyl)aniline intermediates. The 2-sulfamoyl-4-carbamoylsulfamoylaniline intermediate is reacted with an appropriate aldehyde to give the products of Formula I. Reacting the 2-sulfamoyl-4-carbamoylsulfamoylaniline or the 2,4-di-(carbamoylsulfamoyl)aniline intermediate with an ortho ester such as ethyl orthoformate, a carboxylic acid or an acid anhydride gives the products of Formula II.

Procedure C

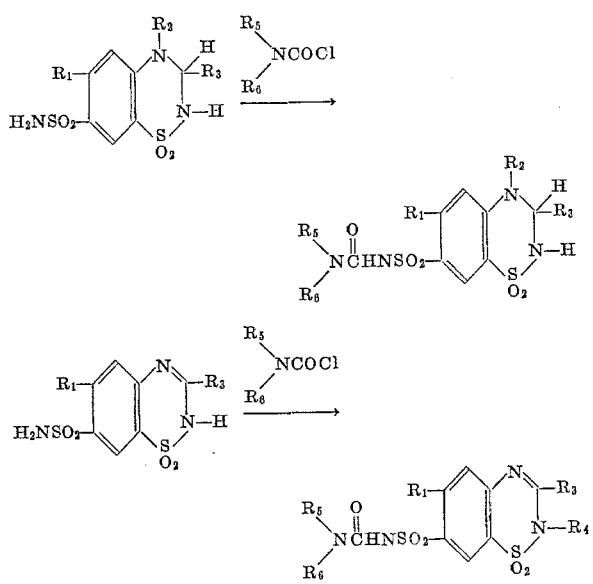

The terms $R_1$, $R_2$, $R_3$, $R_4$, $R_5$ and $R_6$ are as defined above.

According to Procedure C, a 3,4-dihydro-7-sulfamoyl-2H-1,2,4-benzothiadiazide-1,1-dioxide is reacted with one mole of an N-substituted carbamoylchloride to give the 7-carbamoylsulfamoyl compounds of Formula I or a 7-sulfamoyl-2H-1,2,4-benzothiadiazine-1,1-dioxide is reacted with one or two moles of an N-substituted carbamoylchloride to give the compounds of Formula II. The reaction is carried out in an inert solvent such as acetone or a lower alkanol, for example ethanol or isopropanol, in the presence of a base such as an alkali metal carbonate or hydroxide, for example sodium carbonate or sodium hydroxide.

Alternatively, the dihydro products of Formula I are prepared by catalytic hydrogenation of corresponding products of Formula II.

The following examples are not limiting but are illustrative of the compounds of this invention and the processes for their preparation.

EXAMPLE 1

A solution of 3.32 g. n-butylisocyanate in acetone is added to a stirred solution of 10 g. of 6-chloro-3,4-dihydro-7-sulfamoyl - 2H - 1,2,4 - benzothiadiazine - 1,1-dioxide in 35 ml. of 1 N sodium hydroxide and 34 ml. acetone at 5–10° C. The solution is stirred an additional two hours at 5° C., then two hours at room temperature. The acetone is removed in vacuo at 40° C. and the solution is then acidified. The resulting white solid is filtered, then dissolved in methanol and treated with ether to give 7-(n-butylcarbamoyl)sulfamoyl-6-chloro-3,4-dihydro-2H-1,2,4-benzothiadiazine-1,1-dioxide.

EXAMPLE 2

To a stirred mixture of 9.9 g. of 6-chloro-7-sulfamoyl-2H-1,2,4-benzothiadiazine-1,1-dioxide in 35 ml. of 1 N sodium hydroxide and 35 ml. of acetone at 5° C. is added 3.4 g. of n-butylisocyanate in acetone. The resulting mixture is stirred for two hours at room temperature to give, after working up as in Example 1, 7-(n-butylcarbamoyl) sulfamoyl-6-chloro - 2H - 1,2,4 - benzothiadiazine-1,1-dioxide.,

EXAMPLE 3

By the procedure of Example 1, using in place of n-butylisocyanate, 0.03 m. of:

methylisocyanate,
cyclohexylisocyanate,
benzylisocyanate and
phenethylisocyanate there is obtained:

6 - chloro - 3,4 - dihydro - 7 - (methylcarbamoyl)sulfamoyl - 2H - 1,2,4 - benzothiadiazine - 1,1 - dioxide and the corresponding 7-(cyclohexylcarbamoyl), 7-(benzylcarbamoyl) and 7-(phenethylcarbamoyl) derivatives, respectively.

EXAMPLE 4

A solution of 7.8 g. of n-butylisocyanate is added to 10.0 g. of 5-chloro-2,4-disulfamoylaniline in 79 ml. of 1 N sodium hydroxide and 80 ml. of acetone at 10° C. The resulting solution is stirred at 10° C. for two hours, then at room temperature for two hours. The acetone is removed in vacuo and the residue is acidified with dilute hydrochloric acid. The solid material is recrystallized from aqueous ethanol to give 5-chloro-2,4-bis-(n-butylcarbamoyl)sulfamoylaniline. From the filtrate 5-chloro-4-(n-butylcarbamoyl)sulfamoyl-2-sulfamoylaniline is isolated by concentrating, filtering and fractionally crystallizing.

A mixture of 8.0 g. of 5-chloro-2,4-bis-(n-butylcarbamoyl)sulfamoylaniline and 25 ml. of ethyl orthoformate is heated at 100–120° C. for one hour. After evaporating the excess ethyl orthoformate in vacuo, dissolving the residue in methanol and adding ether, the product is 2 - n-butylcarbamoyl-7-(n - butylcarbamoyl)sulfamoyl-6-chloro-2H-1,2,4-benzothiadiazine-1,1-dioxide.

EXAMPLE 5

According to the procedure of Example 4 using in place of 5-chloro-2,4-disulfamoylaniline:

5-bromo-2,4-disulfamoylaniline
2,4-disulfamoylaniline
5-methyl-2,4-disulfamoylaniline and
5-methoxy-2,4-disulfamoylaniline the products obtained are:

6-bromo-2-n-butylcarbamoyl-7-(n-butylcarbamoyl)-sulfamoyl-2H-1,2,4-benzothiadiazine-1,1-dioxide
2-n-butylcarbamoyl-7-(n-butylcarbamoyl)sulfamoyl-2H-1,2,4-benzothiadiazine-1,1-dioxide
2-n-butylcarbamoyl-7-(n-butylcarbamoyl)sulfamoyl-6-methyl-2H-1,2,4-benzothiadiazine-1,1-dioxide and 2-n-butylcarbamoyl-7-(n-butylcarbamoyl)sulfamoyl-6-methoxy - 2H-1,2,4-benzothiadiazine-1,1-dioxide, respectively.

EXAMPLE 6

An acetone solution of 5.0 g. of n-butylisocyanate is added with stirring to 16.4 g. of 7-sulfamoyl-6-trifluoromethyl-2H-1,2,4-benzothiadiazine-1,1-dioxide in 55 ml. of 1 N sodium hydroxide and 55 ml. of acetone at 5–10° C. The stirring is continued for two hours at 5° C., then at room temperature for two hours. Working up as in Example 1 gives 7-(n-butylcarbamoyl)sulfamoyl-6-trifluoromethyl-2H-1,2,4-benzothiadiazine-1,1-dioxide.

Similarly, using 3,4-dihydro-7-sulfamoyl-6-trifluoromethyl-2H-1,2,4-benzothiadiazine-1,1-dioxide as the starting material, the product is 7-(n-butylcarbamoyl)sulfamoyl - 3,4 - dihydro - 6 - trifluoromethyl - 2H - 1,2,4-benzothiadiazine-1,1-dioxide.

EXAMPLE 7

An acetone solution of 14.4 g. of 5-chloro-N-methyl-2,4-disulfamoylaniline, 4.5 g. of n-propylisocyanate and 100 ml. of 1 N sodium hydroxide is stirred at 5–10° C. for two hours, then at room temperature for three hours. Working up as in Example 4 and separating the resulting isomers by chromatography gives 5-chloro-N-methyl-2-sulfamoyl-4-n-propylsulfamoylaniline. Heating this intermediate with 50 ml. of aqueous formaldehyde, 300 ml. of methanol and 10 ml. of aqueous sodium hydroxide for two hours at reflux and working up by acidifying with concentrated hydrochloric acid, concentrating and recrystallizing the residue gives 6-chloro-3,4-dihydro-4-methyl - 7 - n - propylsulfamoyl - 2H - 1,2,4 - benzothiadiazine-1,1-dioxide.

Using acetaldehyde in the above reaction, the product is 6 - chloro - 3,4 - dihydro - 3,4 - dimethyl - 7 - n - propylsulfamoyl-2H-1,2,4-benzothiadiazine-1,1-dioxide.

EXAMPLE 8

A mixture of 5.0 g. of 5-chloro-4-(n-butylcarbamoyl)sulfamoyl-2-sulfamoylaniline (prepared as in Example 4) and 5.8 g. of dichloroacetal in ethanolic hydrogen chloride is heated at reflux for five hours. Concentrating, adding chloroform, cooling and filtering gives 7-(n-butylcarbamoyl)sulfamoyl - 6 - chloro - 3 - dichloromethyl-3,4-dihydro-2H-1,2,4-benzothiadiazine-1,1-dioxide.

By a similar procedure using, in place of dichloroacetal, the following:

phenylacetaldehyde
β-(phenyl)propionaldehyde
propionaldehyde and
butyraldehyde there is obtained:

3-benzyl-7-(n-butylcarbamoyl)sulfamoyl-6-chloro-3,4-dihydro-2H-1,2,4-benzothiadiazine-1,1-dioxide
7-(n-butylcarbamoyl)sulfamoyl-6-chloro-3,4-dihydro-3-phenethyl-2H-1,2,4-benzothiadiazine-1,1-dioxide
7-(n-butylcarbamoyl)sulfamoyl-6-chloro-3-ethyl-3,4-dihydro-2H-1,2,4-benzothiadiazine-1,1-dioxide and
7-(n-butylcarbamoyl)sulfamoyl-6-chloro-3,4-dihydro-3-propyl-2H-1,2,4-benzothiadiazine-1,1-dioxide, respectively.

EXAMPLE 9

A mixture of 9.9 g. of 6-chloro-3,4-dihydro-7-sulfamoyl-2H-1,2,4-benzothiadiazine-1,1-dioxide, 3.6 g. of dimethylcarbamoyl chloride and 1.5 g. of sodium hydroxide in acetone is stirred at room temperature for three hours. Concentrating in vacuo, acidifying and filtering givess 6 - chloro - 3,4 - dihydro - 7 - dimethylcarbamoylsulfamoyl-2H-1,2,4-benzothiadiazine-1,1-dioxide.

By the same procedure, reacting equivalent amounts of 6 - trifluoromethyl - 7 - sulfamoyl - 2H - 1,2,4 - benzothiadiazine-1,1-dioxide and diethylcarbamoyl chloride, the product is 7-diethylcarbamoylsulfamoyl-6-trifluoromethyl-2H-1,2,4-benzothiadiazine-1,1-dioxide.

EXAMPLE 10

By the procedure of Example 9, 6-chloro-3,4-dihydro-7 - sulfamoyl - 2H - 1,2,4 - benzothiadiazine - 1,1 - dioxide is reacted with an equimolar amount of 1-piperidinecarbonyl chloride in the presence of sodium hydroxide in ethanol to give 6-chloro-3,4-dihydro-7-(1-piperidylcarbonyl)sulfamoyl - 2H - 1,2,4 - benzothiadiazine - 1,1-dioxide.

Similarly, using 1-pyrrolidinecarbonyl chloride in place of 1-piperidinecarbonyl chloride, the product is 6-chloro-3,4 - dihydro - 7 - (1 - pyrrolidinecarbonyl)sulfamoyl-2H-1,2,4-benzothiadiazine-1,1-dioxide.

EXAMPLE 11

To a mixture of 16.8 g. of 6-chloro-3-cyclopropyl-7-sulfamoyl-2H-1,2,4-benzothiadiazine-1,1-dioxide and 60 ml. of 1 N sodium hydroxide in acetone at 5° C. is added 5.0 g. of n-propylisocyanate in acetone. The resulting mixture is stirred for two hours at 5° C., then two hours at room temperature. Working up as in Example 1 gives 6 - chloro - 3 - cyclopropyl - 7 - (n - propylcarbamoyl)sulfamoyl - 2H - 1,2,4-benzothiadiazine-1,1-dioxide. From the filtrate there is obtained, by concentrating, filtering and recrystallizing, 6-chloro-3-cyclopropyl-2-(n-propyl)carbamoyl - 7 - (n - propylcarbamoyl)sulfamoyl - 2H-1,2,4-benzothiadiazine-1,1-dioxide.

Similarly, using as the starting material 6-chloro-3-cyclopentyl - 7 - sulfamoyl - 2H - 1,2,4 - benzothiadiazine-1,1-dioxide, the products are 6-chloro-3-cyclopentyl-7-(n-propylcarbamoyl)sulfamoyl - 2H - 1,2,4 - benzothiadiazine-1,1-dioxide and the corresponding 2-(n-propyl)carbamoyl derivative.

Using 3-(2-cyclopentenyl) methyl-3,4-dihydro - 7 - sulfamoyl-6-trifluoromethyl-2H-1,2,4 - benzothiadiazine-1,1-dioxide as the starting material in the above procedure and working up as in Example 1 gives 3(2-cyclopentenyl)methyl-3,4-dihydro - 7 - (n-propylcarbamoyl)sulfamoyl-2H-1,2,4-benzothiadiazine-1,1-dioxide.

Using 6-chloro-3-cyclopentylmethyl - 3,4 - dihydro-7-sulfamoyl-2H-1,2,4-benzothiadiazine-1,1 - dioxide as the starting material in the above procedure and working up as in Example 1, 6-chloro-3-cyclopentylmethyl - 3,4 - dihydro-7-(n-propylcarbamoyl)sulfamoyl - 2H - 1,2,4 - benzothiadiazine-1,1-dioxide is obtained.

EXAMPLE 12

Ten grams of 6-chloro-3,4-dihydro-3-phenoxymethyl-7-sulfamoyl-2H-1,2,4-benzothiadiazine - 1,1 - dioxide and 2.5 g. of n-butylisocyanate are stirred for two hours at 5–10° C. in acetone solution containing 1 N sodium hydroxide. After additional stirring for two hours at room temperature and working up as in Example 1, 7-(n-butylcarbamoyl)sulfamoyl-6-chloro-3,4-dihydro - 3 - phenoxymethyl-2H-1,2,4-benzothiadiazine-1,1-dioxide is obtained.

Similarly, using 6-chloro-3,4-dihydro-3-phenylmercaptomethyl-7-sulfamoyl-2H-1,2,4-benzothiadiazine - 1,1 - dioxide as the starting material, 7-(n-butylcarbamoyl)sulfamoyl-6-chloro-3,4-dihydro - 3 - phenylthiomethyl - 2H-1,2,4-benzothiadiazine-1,1-dioxide is obtained.

What is claimed is:
1. A compound selected from the group consisting of compounds having the following formulas:

*Formula I*

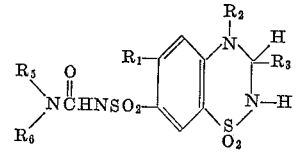

*Formula II*

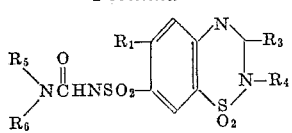

in which:
R₁ is a member selected from the group consisting of hydrogen, halogen, trifluoromethyl, lower alkyl, lower alkoxy and amino;

R₂ is a member selected from the group consisting of hydrogen and lower alkyl;

R₃ is a member selected from the group consisting of hydrogen, lower alkyl, halo lower alkyl, phenyl, benzl, phenethyl, cycloalkyl, cyclopentylmethyl, cyclohexylmethyl, cyclopentenylmethyl, cyclohexenylmethyl, phenoxymethyl and phenylthiomethyl;

R₄ is a member selected from the group consisting of hydrogen and

R₅ is a member selected from the group consisting of lower alkyl, cyclopentyl, cyclohexyl, benzyl and phenethyl; and R₆ is a member selected from the group consisting of hydrogen and, when R₅ is lower alkyl, lower alkyl and, when taken together with R₅ and the nitrogen atom to which they are attached, N-pyrrolidinyl and N-piperidyl.

2. A compound according to Formula I of claim 1 in which R₁ is chloro, R₂ and R₃ are hydrogen, R₅ is lower alkyl and R₆ is hydrogen, said compound being 6-chloro-3,4-dihydro-7 - (lower alkylcarbamoyl)sulfamoyl - 2H-1,2,4-benzothiadiazine-1,1-dioxide.

3. A compound according to Formula I of claim 1 in which R₁ is chloro, R₂ and R₃ are hydrogen, R₅ is n-butyl and R₆ is hydrogen, said compound being 7-(n-butylcarbamoyl)sulfamoyl-6-chloro-3,4-dihydro-2H - 1,2,4 - benzothiadiazine-1,1-dioxide.

4. A compound according to Formula I of claim 1 in which R₁ is trifluoromethyl, R₂ and R₃ are hydrogen, R₅ is lower alkyl and R₆ is hydrogen, said compound being 3,4-dihydro-7-(lower alkylcarbamoyl)sulfamoyl - 6 - trifluoromethyl-2H-1,2,4-benzothiadiazine-1,1-dioxide.

5. A compound according to Formula I of claim 1 in which R₁ is chloro, R₂ is hydrogen, R₃ is dichloromethyl, R₅ is lower alkyl and R₆ is hydrogen, said compound being 6-chloro-3-dichloromethyl-3,4-dihydro - 7 - (lower alkylcarbamoyl)sulfamoyl-2H-1,2,4 - benzothiadiazine - 1,1-dioxide.

6. A compound according to Formula I of claim 1 in which R₁ is chloro, R₂ is hydrogen, R₃ is benzyl, R₅ is lower alkyl and R₆ is hydrogen, said compound being 3-benzyl-6-chloro-3,4-dihydro-7 - (lower alkylcarbamoyl)sulfamoyl-2H-1,2,4-benzothiadiazine-1,1-dioxide.

7. A compound according to Formula I of claim 1 in which R₁ is chloro, R₂ is hydrogen, R₃ is ethyl, R₅ is lower alkyl and R₆ is hydrogen, said compound being 6-chloro-3-ethyl-3,4-dihydro-7 - (lower alkylcarbamoyl)sulfamoyl-2H-1,2,4-benzothiadiazine-1,1-dioxide.

8. A compound according to Formula II of claim 1 in which R₁ is chloro, R₂, R₃ and R₄ are hydrogen, R₅ is n-butyl and R₆ is hydrogen, said compound being 7-(n-butylcarbamoyl)sulfamoyl-6-chloro-2H-1,2,4 - benzothiadiazine-1,1-dioxide.

References Cited
UNITED STATES PATENTS 3,252,975   5/1966   De Stevens et al. ____ 260.—243

NICHOLAS S. RIZZO, *Primary Examiner.*

UNITED STATES PATENT OFFICE
CERTIFICATE OF CORRECTION

Patent No. 3,344,140                        September 26, 1967

Bernard Loev

It is hereby certified that error appears in the above numbered patent requiring correction and that the said Letters Patent should read as corrected below.

Column 1, lines 32 to 37 and column 7, lines 2 to 6, the formula, each occurrence, should appear as shown below instead of as in the patent:

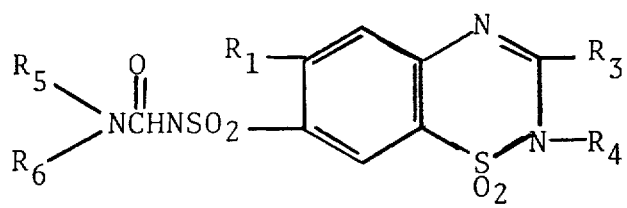

column 2, lines 48 to 52, the formulas should appear as shown below instead of as in the patent:

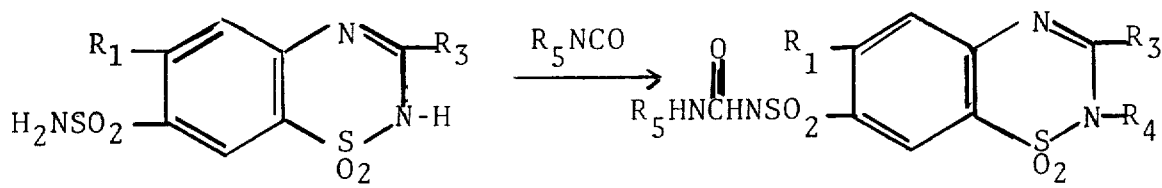

Signed and sealed this 29th day of October 1968.

(SEAL)
Attest:

EDWARD M. FLETCHER, JR.                    EDWARD J. BRENNER
Attesting Officer                               Commissioner of Patents